United States Patent
Huang et al.

(10) Patent No.: US 10,804,738 B2
(45) Date of Patent: *Oct. 13, 2020

(54) MULTIPATH CHARGER AND CHARGING METHOD THEREOF

(71) Applicant: MediaTek Inc., Hsin-chu (TW)

(72) Inventors: Chih-Chien Huang, Hsinchu (TW);
Po-Hsin Chen, Zhubei (TW);
Chih-Yuan Hsu, Hsinchu (TW)

(73) Assignee: MediaTek Inc., Hsin-Chu (TW)

( * ) Notice: Subject to any disclaimer, the term of this patent is extended or adjusted under 35 U.S.C. 154(b) by 43 days.

This patent is subject to a terminal disclaimer.

(21) Appl. No.: 16/353,913

(22) Filed: Mar. 14, 2019

(65) Prior Publication Data
US 2019/0280506 A1 Sep. 12, 2019

Related U.S. Application Data

(63) Continuation of application No. 14/763,587, filed as application No. PCT/CN2014/094832 on Dec. 24, 2014, now Pat. No. 10,277,050.
(Continued)

(51) Int. Cl.
*H02J 7/00* (2006.01)
*H02J 50/00* (2016.01)
(Continued)

(52) U.S. Cl.
CPC .............. *H02J 50/00* (2016.02); *H02J 7/02* (2013.01); *H02J 7/025* (2013.01); *H02M 3/158* (2013.01);
(Continued)

(58) Field of Classification Search
CPC ........ H02J 2207/40; H02J 7/025; H02J 50/00; H02J 7/02; H02J 7/00; H02J 7/0072;
(Continued)

(56) References Cited

U.S. PATENT DOCUMENTS 10,277,050 B2    4/2019   Huang et al.
2005/0162020 A1   7/2005   Lanni
(Continued)

FOREIGN PATENT DOCUMENTS

CN     101989755 A    3/2011
CN     201887500 U    6/2011
(Continued)

OTHER PUBLICATIONS

International Search Report dated Mar. 6, 2015 in connection with International Application No. PCT/CN2014/094832.
(Continued)

*Primary Examiner* — Zixuan Zhou
(74) *Attorney, Agent, or Firm* — Wolf, Greenfield & Sacks, P.C.

(57) ABSTRACT

A multipath charger includes a first charging path, a second charging path, and a management module. A supply voltage is coupled through the first charging path and the second charging path to a battery. The management module provides the supply voltage and detects the operating state of the battery. The management module selectively enables the first charging path, the second charging path, or both according to the operating state of the battery, so as to charge the battery through the enabled charging path.

8 Claims, 6 Drawing Sheets

Related U.S. Application Data

(60) Provisional application No. 61/920,848, filed on Dec. 26, 2013.

(51) Int. Cl.
  H02J 7/02    (2016.01)
  H02M 3/158   (2006.01)
  H02M 1/00        (2006.01)
  H02J 1/10        (2006.01)

(52) U.S. Cl.
  CPC ............... *H02J 1/102* (2013.01); *H02J 7/00* (2013.01); *H02J 7/0072* (2013.01); *H02J 2207/40* (2020.01); *H02M 1/00* (2013.01); *H02M 2001/0045* (2013.01)

(58) Field of Classification Search
  CPC ...... H02J 1/102; H02J 11/00; H02J 7/007194; H02J 7/0071; H02M 3/158; H02M 1/00; H02M 2001/0045
  USPC .................................................. 320/107, 108
  See application file for complete search history.

(56)         References Cited

U.S. PATENT DOCUMENTS

| | | | |
|---|---|---|---|
| 2008/0258687 | A1 | 10/2008 | So et al. |
| 2009/0206794 | A1* | 8/2009 | Ferguson ................ H02J 7/045 320/134 |
| 2009/0237029 | A1 | 9/2009 | Andelfinger |
| 2009/0261784 | A1 | 10/2009 | MacNair, Jr. et al. |
| 2010/0013432 | A1 | 1/2010 | Toya et al. |
| 2011/0156636 | A1* | 6/2011 | Kim .................... H02J 7/00302 320/108 |
| 2012/0280648 | A1* | 11/2012 | Hwang ................ H02J 7/0013 320/108 |
| 2012/0286741 | A1 | 11/2012 | Seethaler et al. |
| 2015/0069951 | A1 | 3/2015 | Wang et al. |
| 2015/0357851 | A1 | 12/2015 | Huang et al. |

FOREIGN PATENT DOCUMENTS

| | | | |
|---|---|---|---|
| GB | 2474261 | A | 4/2011 |
| JP | 2012-029480 | A | 2/2012 |
| WO | WO 2008/075140 | A1 | 6/2008 |

OTHER PUBLICATIONS

Written Opinion dated Mar. 6, 2015 in connection with International Application No. PCT/CN2014/094832.

International Preliminary Report on Patentability dated Jul. 7, 2016 in connection with International Application No. PCT/CN2014/094832.

Jung et al., Analog-Digital Switching Mixed Mode Low Ripple—High Efficiency Li-Ion Battery Charger. Conference Record of the 2001 IEEE Industruy Applications Conference. 36th IAS Annual Meeting. Sep. 2001:2473-7.

* cited by examiner

MULTIPATH CHARGER AND CHARGING METHOD THEREOF

CROSS REFERENCE TO RELATED APPLICATIONS

This application is a continuation of U.S. application Ser. No. 14/763,587, filed Jul. 27, 2015, entitled "MULTIPATH CHARGER AND CHARGING METHOD THEREOF", which is a national stage filing under 35 U.S.C. § 371 of International Patent Application Ser. No. PCT/CN2014/094832, filed Dec. 24, 2014, entitled "MULTIPATH CHARGER AND CHARGING METHOD THEREOF", which claims priority to U.S. Provisional Application Ser. No. 61/920,848, filed Dec. 26, 2013, entitled "MULTIPLE CHARGING PATHS". The entire contents of these applications are incorporated herein by reference in their entirety.

TECHNICAL FIELD

The disclosure generally relates to a multipath charger, and more particularly, to a multipath charger to charge a battery with high efficiency.

BACKGROUND

As technology advances, mobile electronic devices are becoming more and more popular. For example, smartphones, tablet computers, and notebook computers play an important role in the lives of modern people. Mobile electronic devices are usually supplied with power by their batteries. Nowadays, people prefer batteries with large capacity, but it has become a critical challenge to charge large-capacity batteries in a short time. Generally speaking, a conventional charger uses only one charging path to charge a battery, and such a design has disadvantages, such as a long charging time, thermal effects, and insufficient charging capabilities. As a result, there is a need to design a novel charger to overcome the problems of the prior art.

SUMMARY

In one exemplary embodiment, the disclosure is directed to a multipath charger including a first charging path, a second charging path, and a management module. A supply voltage is coupled through the first charging path and the second charging path to a battery. The management module provides the supply voltage and detects an operating state of the battery. The management module selectively enables the first charging path, the second charging path, or both according to the operating state of the battery, so as to charge the battery through the enabled charging path.

In some embodiments, the second charging path is completely separate from the first charging path.

In some embodiments, the management module is further coupled to one or more adapters so as to obtain electric power and generate the supply voltage.

In some embodiments, the adapters include an AC (Alternating Current) adapter and/or a USB (Universal Serial Bus) adapter.

In some embodiments, the first charging path is implemented with a main charging circuit, and the second charging path is implemented with an auxiliary charging circuit.

In some embodiments, the main charging circuit is a switching charging circuit.

In some embodiments, the switching charging circuit includes a first PMOS transistor (P-type Metal Oxide Semiconductor Field Effect Transistor), an NMOS transistor (N-type Metal Oxide Semiconductor Field Effect Transistor), and an inductor. The first PMOS transistor has a gate controlled by the management module, a source coupled to the supply voltage, and a drain coupled to an inner node. The NMOS transistor has a gate controlled by the management module, a source coupled to a ground voltage, and a drain coupled to the inner node. The inner node is coupled through the inductor to the battery.

In some embodiments, the auxiliary charging circuit is a linear charging circuit or a wireless charging circuit.

In some embodiments, the linear charging circuit includes a second PMOS transistor (P-type Metal Oxide Semiconductor Field Effect Transistor). The second PMOS transistor has a gate controlled by the management module, a source coupled to the supply voltage, and a drain coupled to the battery.

In some embodiments, the management module further detects connection states and capabilities of the adapters.

In some embodiments, when the AC adapter and the USB adapter are both coupled to the management module, the management module enables both the main charging circuit and the auxiliary charging circuit.

In some embodiments, when only the AC adapter is coupled to the management module and the AC adapter has a capability of supplying a relatively large power current, the management module enables both the main charging circuit and the auxiliary charging circuit.

In some embodiments, when only the AC adapter is coupled to the management module and the AC adapter has a capability of supplying a relatively small power current, the management module enables the main charging circuit and disables the auxiliary charging circuit.

In some embodiments, when only the USB adapter is coupled to the management module, the management module enables the main charging circuit and disables the auxiliary charging circuit.

In some embodiments, when the AC adapter and the USB adapter are both decoupled from the management module, the management module disables both the main charging circuit and the auxiliary charging circuit.

In some embodiments, the operating state of the battery includes a battery voltage, a battery temperature, and a battery capacity.

In some embodiments, when the battery temperature is higher than a temperature threshold, the management module reduces currents on the first charging path and/or the second charging path.

In some embodiments, when the battery temperature is higher than a temperature threshold, the management module disables one or both the first charging path and the second charging path.

In another exemplary embodiment, the disclosure is directed to a method for charging a battery, including the steps of: providing a first charging path and a second charging path, wherein a supply voltage is coupled through the first charging path and the second charging path to the battery; detecting an operating state of the battery; selectively enabling the first charging path, the second charging path, or both according to the operating state of the battery; and charging the battery through the enabled charging path.

BRIEF DESCRIPTION OF DRAWINGS

The invention can be more fully understood by reading the subsequent detailed description and examples with references made to the accompanying drawings, wherein.

DETAILED DESCRIPTION

In order to illustrate the purposes, features and advantages of the invention, the embodiments and figures of the invention will be described in detail as follows.

Figure 1:
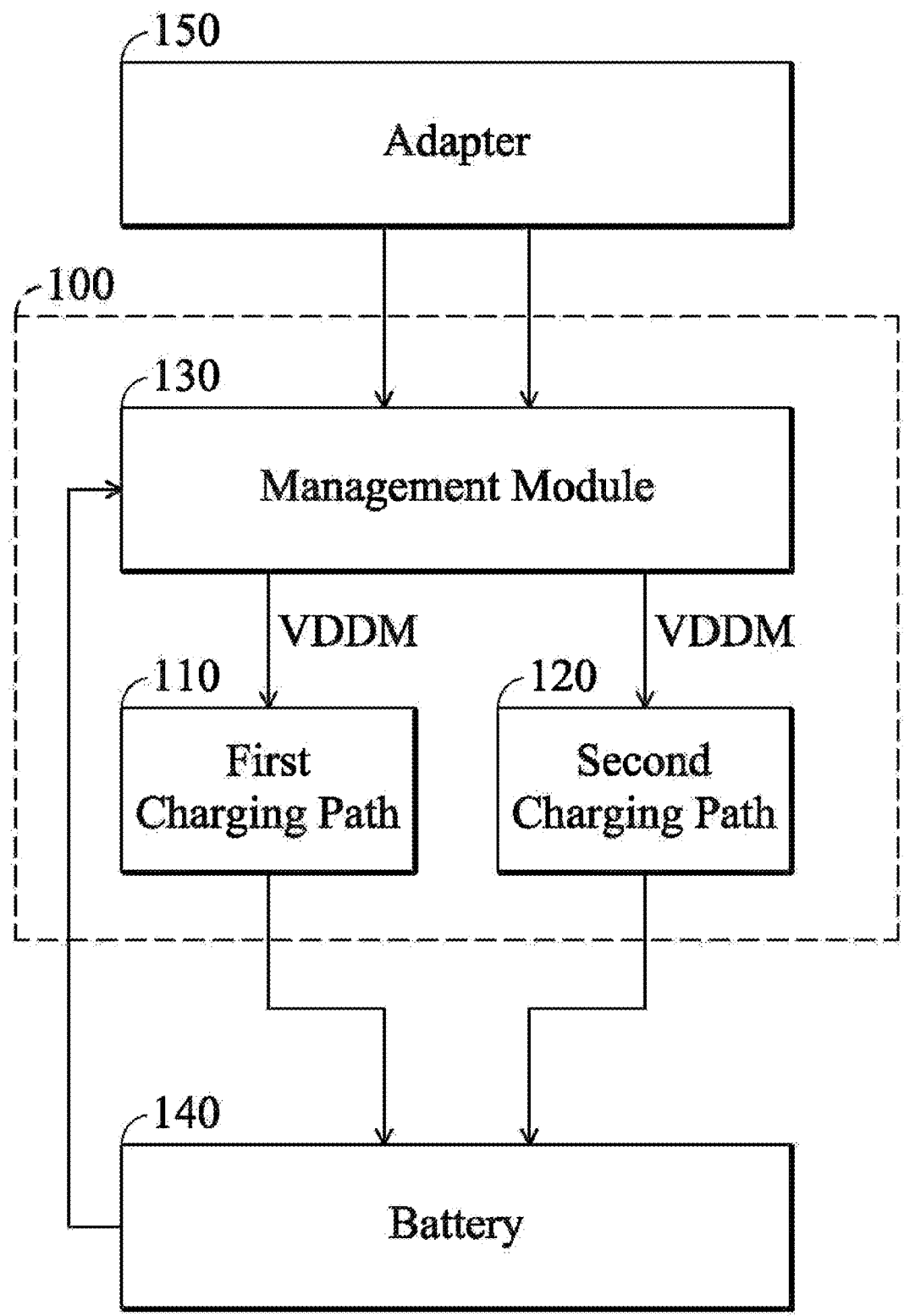
FIG. 1 is a diagram of a multipath charger according to an embodiment of the invention.

FIG. 1 is a diagram of a multipath charger 100 according to an embodiment of the invention. The multipath charger 100 may be used in a mobile electronic device, such as a smartphone, a tablet computer, a media player, a music player, or a notebook computer. As shown in FIG. 1, the multipath charger 100 at least includes a first charging path 110, a second charging path 120, and a management module 130. The multipath charger 100 may be an independent circuit chip designed in the mobile electronic device. The mobile electronic device includes a battery 140. The battery 140 supplies electric power to the mobile electronic device. During a charging process, the battery 140 is charged through the multipath charger 100 by one or more external adapters 150, which are accessories of the mobile electronic device. The management module 130 may be coupled to one or more adapters 150, so as to obtain electric power therefrom and generate a supply voltage VDDM. When the battery 140 is charged, the supply voltage VDDM may be coupled through the first charging path 110 and/or the second charging path 120 to the battery 140. Preferably, the second charging path 120 is completely separate from the first charging path 110. The management module 130 further detects the operating state of the battery 140 and therefore optimizes the efficiency of the charging process. More particularly, during the charging process, the management module 130 selectively enables the first charging path 110, the second charging path 120, or both according to the operating state of the battery 140, so as to charge the battery 140 through the enabled charging path. In other words, the supply voltage VDDM may be coupled through the first charging path 110, the second charging path 120, or both to the battery 140. In the invention, the multipath charger 100 can use more than one charging path to charge the battery 140, and which has the advantage of increasing the charging efficiency, reducing the thermal effect, and shortening the total charging time, in comparison with the prior art. The detailed structure and operation of the multipath charger 100 will be described in the following embodiments. It should be understood that these embodiments are just exemplary, rather than restrict limitations of the invention.

Figure 2:
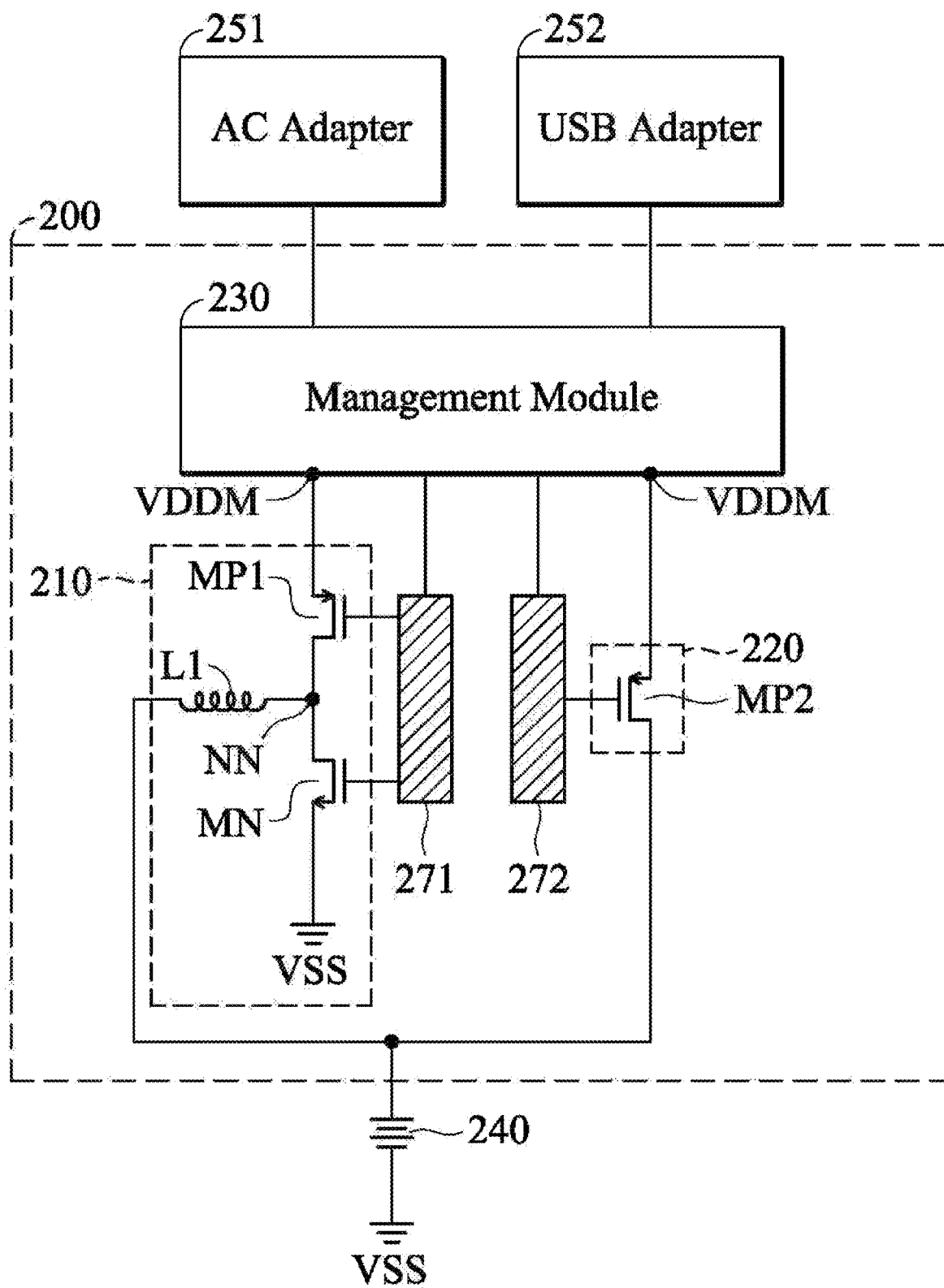
FIG. 2 is a diagram of a multipath charger according to an embodiment of the invention.

FIG. 2 is a diagram of a multipath charger 200 according to an embodiment of the invention. In the embodiment of FIG. 2, the multipath charger 200 at least includes a first charging path 210, a second charging path 220, and a management module 230. Similarly, the multipath charger 200 may be used in a mobile electronic device, and the mobile electronic device may include a battery 240. When the battery 240 is charged, the multipath charger 200 may be coupled to one or more adapters, so as to obtain electric power therefrom and generate a supply voltage VDDM. For example, the aforementioned adapters may include an AC (Alternating Current) adapter 251, a USB (Universal Serial Bus) adapter 252, or both. The mobile electronic device with the multipath charger 200 may have at least two separate sockets for connection with the AC adapter 251 and the USB adapter 252. The AC adapter 251 may have a first terminal coupled to a fixed AC power source (not shown), and a second terminal coupled to the management module 230. The USB adapter 252 may have a USB terminal coupled to a desktop computer (not shown), and a Micro-USB terminal coupled to the management module 230.

In the embodiment of FIG. 2, the first charging path 210 is implemented with a main charging circuit, and the second charging path 220 is implemented with an auxiliary charging circuit. The main charging circuit has a relatively strong ability to charge the battery 240, and the auxiliary charging circuit has a relatively weak ability to charge the battery 240. For example, the main charging circuit may be a switching charging circuit, and the auxiliary charging circuit may be a linear charging circuit. Alternatively, the auxiliary charging circuit may be replaced with a wireless charging circuit (not shown).

As shown in FIG. 2, the main charging circuit (i.e., the switching charging circuit) includes a first PMOS transistor (P-type Metal Oxide Semiconductor Field Effect Transistor) MP1, an NMOS transistor (N-type Metal Oxide Semiconductor Field Effect Transistor) MN, and an inductor L1. The first PMOS transistor MP1 has a gate controlled by the management module 230, a source coupled to the supply voltage VDDM, and a drain coupled to an inner node NN. The NMOS transistor MN has a gate controlled by the management module 230, a source coupled to a ground voltage VSS, and a drain coupled to the inner node NN. The inner node NN is coupled through the inductor L1 to the battery 240. A DC-to-DC (Direct Current to Direct Current) converter is formed by the first PMOS transistor MP1 and the NMOS transistor MN. The management module 230 may use a first driver 271 (optional element) to control the gate of the first PMOS transistor MP1 and the gate of the NMOS transistor MN. When the main charging circuit is enabled, the management module 230 periodically turns on and off the first PMOS transistor MP1 and the NMOS transistor MN, and therefore the average output voltage at the inner node NN is lower than the supply voltage VDDM. The inductor L1 can eliminate the high-frequency components of the output voltage at the inner node NN, and it serves as a low-pass filter. According to the energy conservation law, since the average output voltage at the inner node NN is lower than the supply voltage VDDM, the average output current through the main charging circuit to the battery 240 should be larger than the supply current from the supply voltage VDDM. As a result, the main charging circuit has a relatively strong ability to charge the battery 240.

The auxiliary charging circuit (i.e., the linear charging path) includes a second PMOS transistor (P-type Metal Oxide Semiconductor Field Effect Transistor) MP2. The second PMOS transistor MP2 has a gate controlled by the management module 230, a source coupled to the supply voltage VDDM, and a drain coupled to the battery 240. The management module 230 may use a second driver 272 (optional element) to control the gate of the second PMOS transistor MP2. When the auxiliary charging circuit is enabled, the management module 230 turns on the second PMOS transistor MP2. Since the second PMOS transistor MP2 has a turned-on resistance which results in an IR drop, the auxiliary charging circuit has a relatively weak ability to charge the battery 240.

As mentioned above, the management module 230 selectively enables the main charging circuit, the auxiliary charging circuit, or both according to the operating state of the battery 240. In alternative embodiments, the management module 230 further detects the connection states and the capabilities of the adapters, and performs the above enable-selection process accordingly. More particularly, the enable-selection process relative to the adapters are described in Table I as follows.

TABLE I

Relationship Between Connection of Adapters and Selection of Charging Paths

| Case | AC Adapter | USB Adapter | Main Charging Circuit | Auxiliary Charging Circuit |
|---|---|---|---|---|
| 1 | Connected | Connected | Enabled | Enabled |
| 2/3 | Connected | Disconnected | Enabled | Enabled/Disabled |
| 4 | Disconnected | Connected | Enabled | Disabled |
| 5 | Disconnected | Disconnected | Disabled | Disabled |

Please refer to Table I to understand the five different enable selection cases. In the first case, when it is detected that the AC adapter 251 and the USB adapter 252 are both coupled to the management module 230, the management module 230 enables both the main charging circuit and the auxiliary charging circuit, such that the battery 240 is charged by the supply voltage VDDM through both the main charging circuit and the auxiliary charging circuit. Under the circumstance, the AC adapter 251 and the USB adapter 252 are considered as a combined super adapter, and the multipath charger 200 can charge the battery 240 in the shortest time by using both charging paths.

In the second case, when it is detected that only the AC adapter 251 is coupled to the management module 230 and the AC adapter 251 has the capability of supplying a relatively large power current (i.e., a strong AC power source), the management module 230 enables both the main charging circuit and the auxiliary charging circuit, such that the battery 240 is charged by the supply voltage VDDM through both the main charging circuit and the auxiliary charging circuit. The second case is similar to the first case. Because the AC adapter 251 supplies a relatively large power current, it can be used as a super adapter, and the multipath charger 200 can charge the battery 240 by using both charging paths.

In the third case, when it is detected that only the AC adapter 251 is coupled to the management module 230 and the AC adapter 251 has the capability of supplying a relatively small power current (i.e., a weak AC power source), the management module 230 enables the main charging circuit and disables the auxiliary charging circuit, such that the battery 240 is charged by the supply voltage VDDM through only the main charging circuit. Under the circumstance, the AC adapter 251 merely supplies a relatively small power current, and there is no need to use both the main charging circuit and the auxiliary charging circuit. Since the main charging circuit has higher charging efficiency, the management module 230 enables only the main charging circuit to charge the battery 240.

In the fourth case, when it is detected that only the USB adapter 252 is coupled to the management module 230, the management module 230 enables the main charging circuit and disables the auxiliary charging circuit, such that the battery 240 is charged by the supply voltage VDDM through only the main charging circuit. The fourth case is similar to the third case. The USB adapter 252 merely supplies a relatively small power current, and there is no need to use both the main charging circuit and the auxiliary charging circuit. Since the main charging circuit has higher charging efficiency, the management module 230 enables only the main charging circuit to charge the battery 240.

In the fifth case, when it is detected that the AC adapter 251 and the USB adapter 252 are both decoupled from the management module 230, the management module 230 disables both the main charging circuit and the auxiliary charging circuit, such that no charging path is formed between the supply voltage VDDM and the battery 240. Under the circumstance, the charging process of the battery 240 is completely stopped.

It should be understand that the figuration of the multipath charger 200 of FIG. 2 is just exemplary, and other figurations with similar functions are acceptable in the invention. In some embodiments, the multipath charger 200 includes more than two charging paths and is coupled to more than two adapters (not shown). The multipath charger 200 may select and enable one or more charging paths according to the connection states and capabilities of the adapters, and according to the operating state of the battery 240. In alternative embodiments, the multipath charger 200 may include two or more main charging circuits and/or two or more auxiliary charging circuits, and the multipath charger 200 may be coupled to two or more AC adapters and/or two or more USB adapters.

Figure 3:
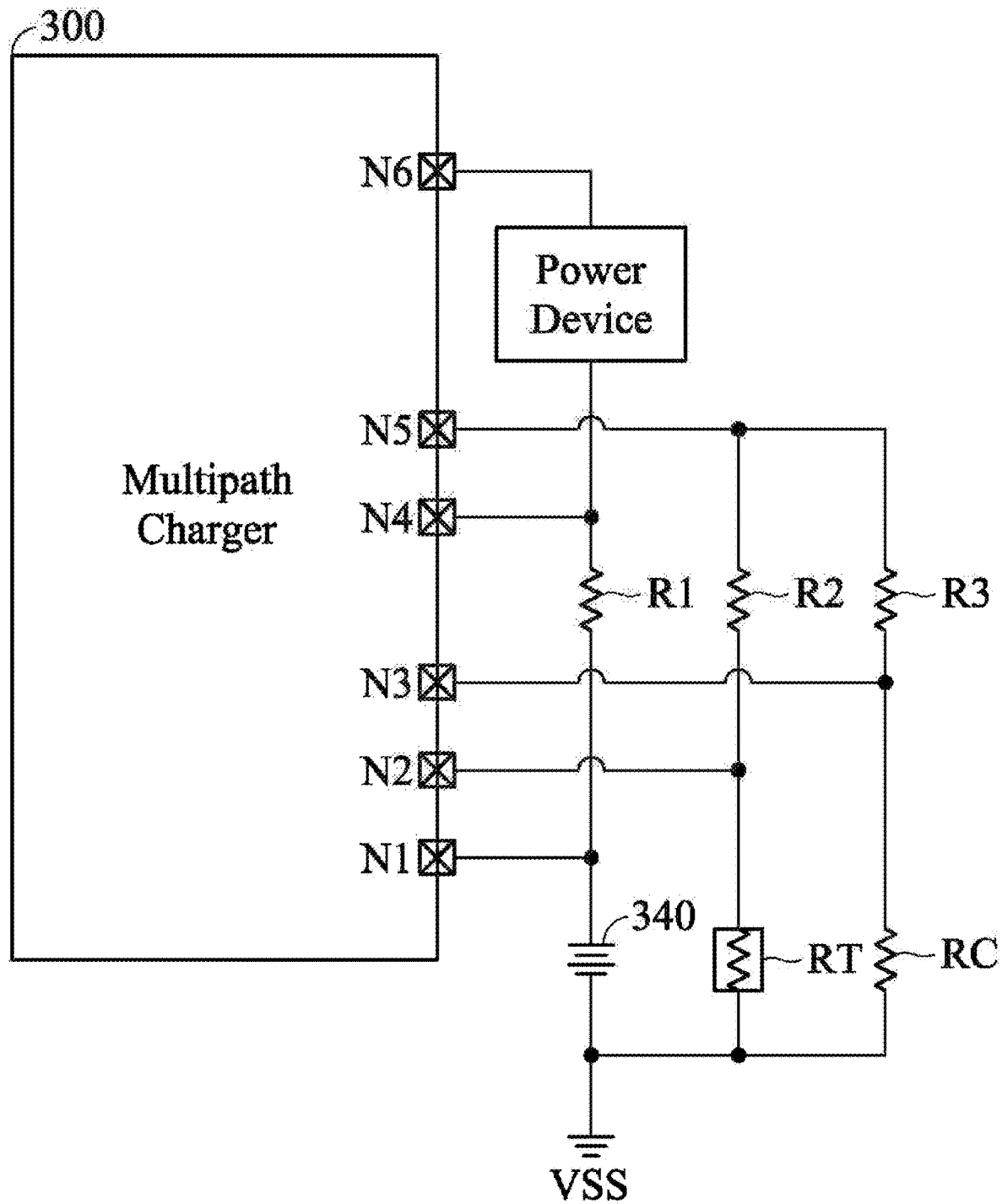
FIG. 3 is a diagram of a multipath charger coupled to a battery circuit according to an embodiment of the invention.

FIG. 3 is a diagram of a multipath charger 300 coupled to a battery circuit according to an embodiment of the invention. Similarly, the multipath charger 300 selectively enables its two or more charging paths (not shown) according to the operating state of a battery 340. In the embodiment of FIG. 3, the operating state of the battery 340 includes a battery voltage, a battery temperature, and a battery capacity. The operating state of the battery 340 is detected by the multipath charger 300 from the battery circuit. In the battery circuit, the battery 340 is integrated with a NTC (Negative Temperature Coefficient) resistor RT and a battery capacity resistor RC. The battery 340 is coupled to the multipath charger 300 at a first node N1. The NTC resistor RT is coupled to the multipath charger 300 at a second node N2. The battery capacity resistor RC is coupled to the multipath charger 300 at a third node N3. By detecting signals from the first node N1, the second node N2, and the third node N3, the management module (not shown) of the multipath charger 300 can obtain details about the operating state of the battery 340, such as the battery voltage, the battery temperature, and the battery capacity. The operating state of the battery 340 may be used to determine and optimize the above enable selection of charging paths. The other resistors R1, R2, R3 and the other nodes N4, N5, N6 can provide current paths, and charging currents from the multipath charger 300 can flow to the battery 340 through such current paths.

Figure 4:
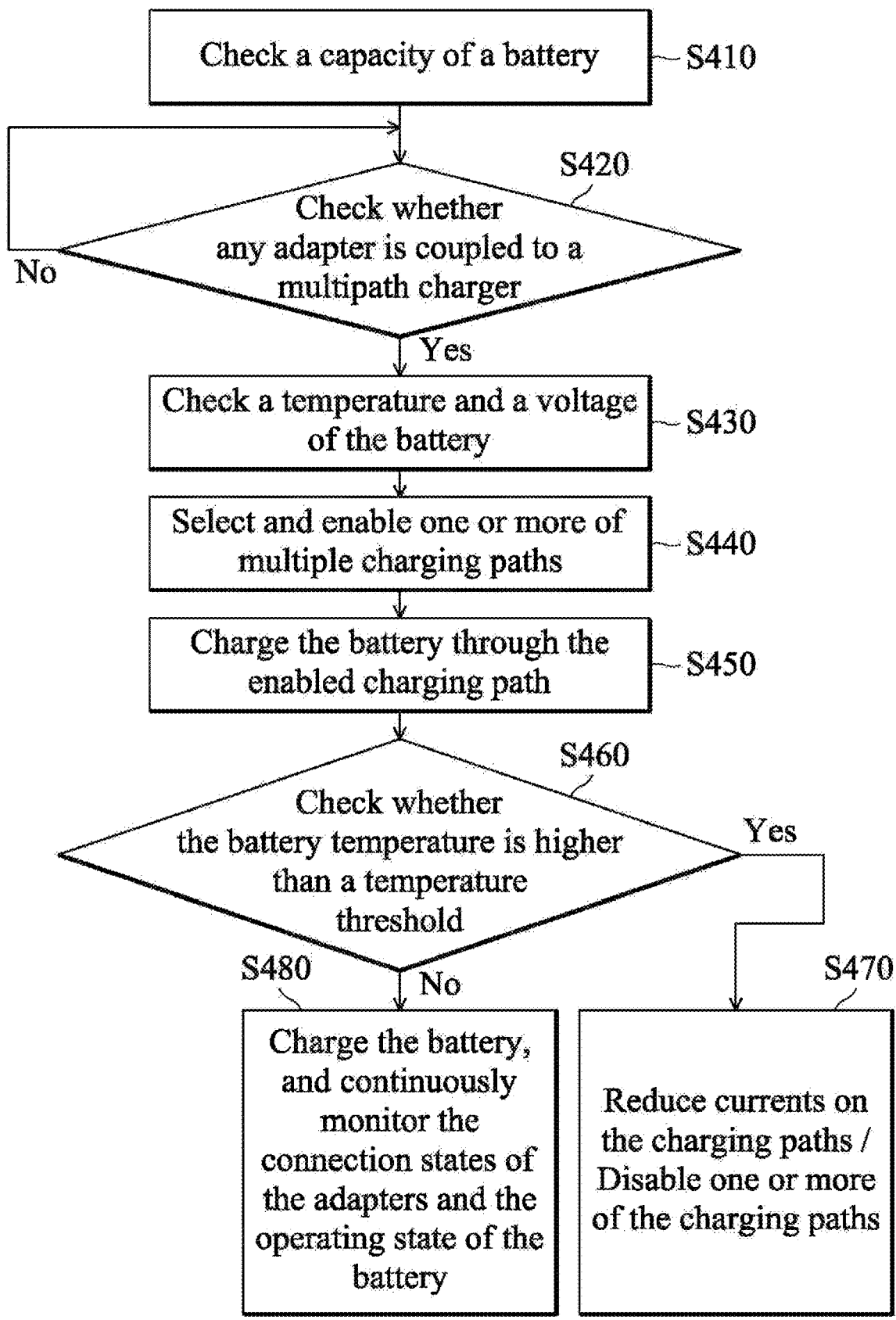
FIG. 4 is a flowchart of an enable-selection process of a management module according to an embodiment of the invention.

FIG. 4 is a flowchart of an enable-selection process of a management module according to an embodiment of the invention. In the embodiment of FIG. 4, the enable-selection process performed by the management module of a multipath charger is described in detail as follows. In step S410, the management module checks the capacity of a battery. Next, in step S420, the management module checks whether any adapter is coupled to the multipath charger (i.e., it checks the connection state of the adapter). If so, the management module may further check the capability of the adapter coupled thereto. For example, the adapter's ability to supply a power current may be checked. In step S430, the management module checks the temperature and the voltage of the battery. Then, in step S440, the management module selects and enables one or more of charging paths according to the connection state of the adapter, the capability of the adapter, the battery capacity, the battery voltage, and/or the battery temperature. In step S450, the management module charges the battery through the enabled charging path. In step S460, during the charge process, the management module checks whether the battery temperature is higher than a temperature threshold. If so, in step S470, the management module may reduce the currents on the enabled charging path, and/or may disable one or more of the charging paths, such that the battery temperature may be decreased. If no, in step S480, the charge process may be maintained, and the management module may continuously monitor the connection state of the adapter, the capability of the adapter, the battery capacity, the battery voltage, and/or the battery temperature. When the operating state of the battery is changed and/or the connection state and the capability of the adapter is changed, the management module may reselect the charging paths accordingly; that is, the enable-selection process may go back to step S440 again.

Figure 5:
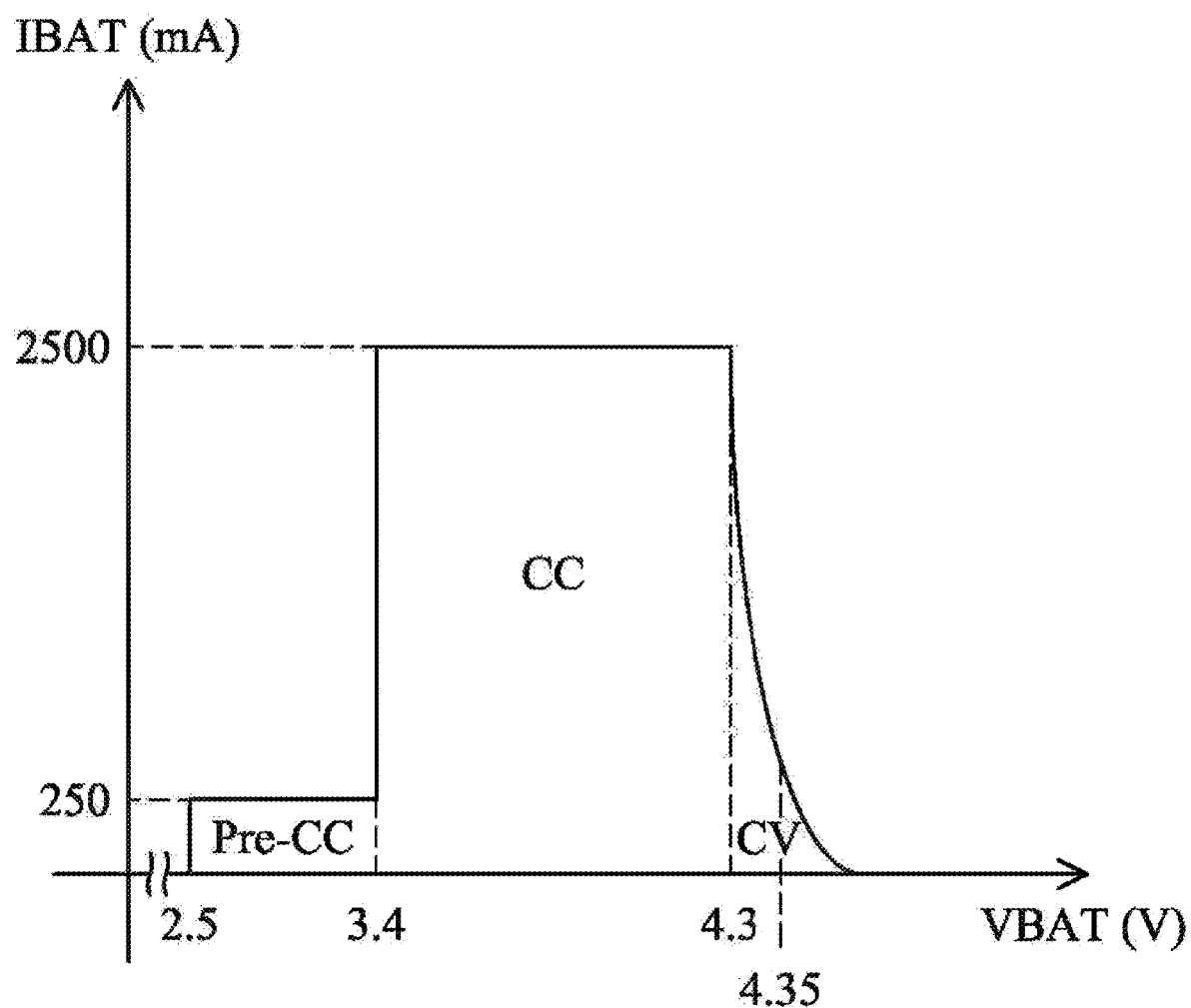
FIG. 5 is a diagram of a charging state of a battery according to an embodiment of the invention.

FIG. 5 is a diagram of a charging state of a battery according to an embodiment of the invention. The horizontal axis represents a voltage difference of the battery (VBAT), and the vertical axis represents a current through the battery (BAT). In the embodiment of FIG. 5, it is assumed that a capacity of the battery is equal to 2500 mAh, but the invention is not limited thereto. As shown in FIG. 5, when the battery voltage is lower than a first voltage threshold (e.g., 3.4V), the management module selects a pre-CC (Pre-Constant Current) mode to charge the battery. In the pre-CC mode, the current through the battery is relatively small (e.g., 250 mA). Once the battery voltage is charged up and higher than the first voltage threshold (e.g., 3.4V), the management module selects a CC (pre-Constant Current) mode to charge the battery. In the CC mode, the current through the battery is relatively large (e.g., 2500 mAh, i.e., 10 times the current in the pre-CC mode). Then, when the battery voltage reaches a second voltage threshold (e.g., 4.3V), the management module selects a CV (Constant Voltage) mode to charge the battery. In the CV mode, the current through the battery becomes very small, and the charging process is gradually stopped at a full-charge battery voltage (e.g., 4.35V). The aforementioned enable-selection process may be performed by the management module of the multipath charger while the battery is being operated in the CC mode. On the other hand, in the pre-CC mode or the CV mode, the management module of the multipath charger usually enables only one predetermined charging path (e.g., a main charging circuit) to charge the battery.

Figure 6:
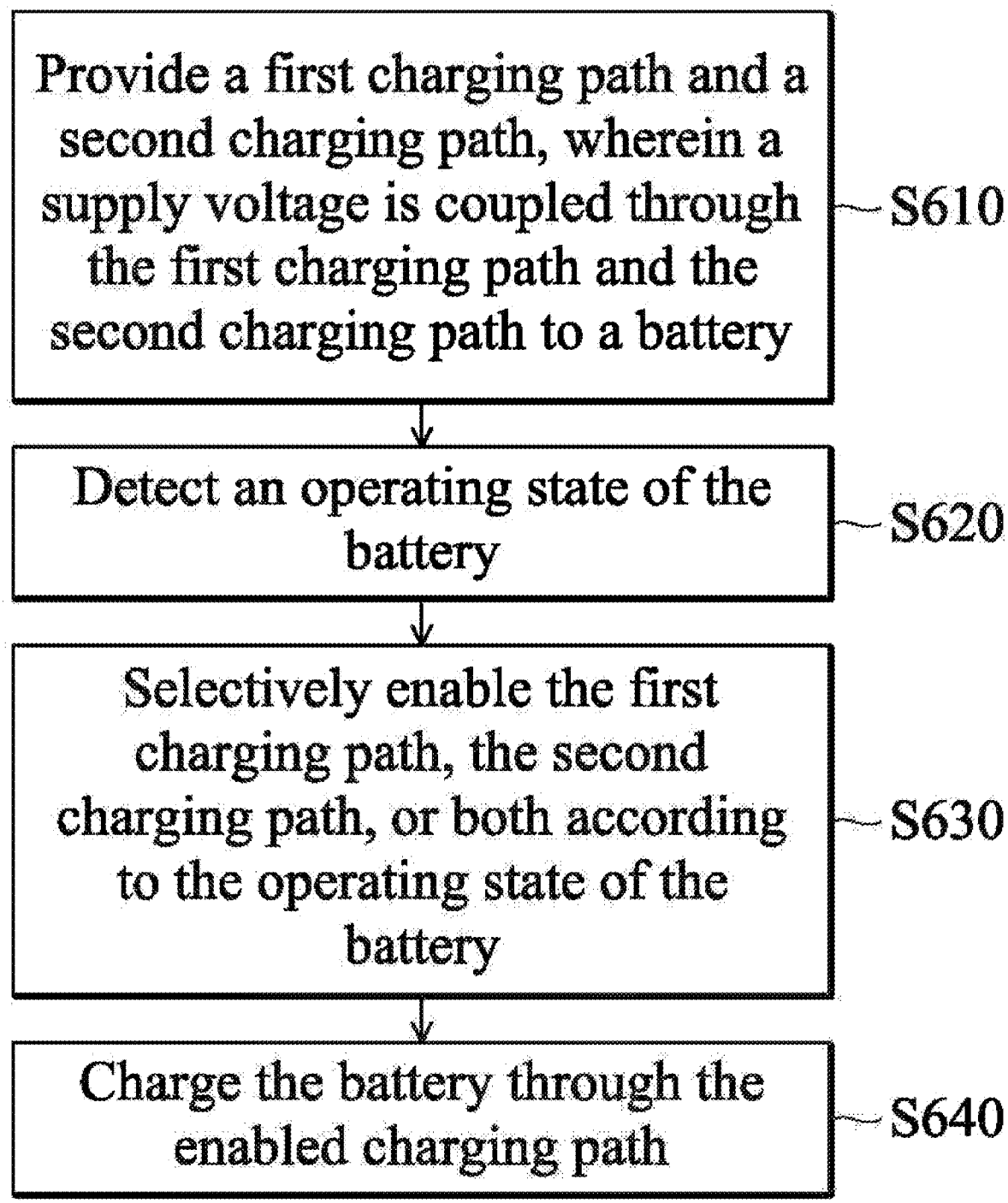
FIG. 6 is a flowchart of method for charging a battery according to an embodiment of the invention.

FIG. 6 is a flowchart of method for charging a battery according to an embodiment of the invention. In step S610, a first charging path and a second charging path are provided, and a supply voltage is coupled through the first charging path and the second charging path to a battery. In step S620, the operating state of the battery is detected. In step S630, the first charging path, the second charging path, or both are selectively enabled according to the operating state of the battery. In step S640, the battery is charged through the enabled charging path. It should be understood that the above steps are not required to be performed sequentially, and any one or more features of the embodiments of FIGS. 1 to 5 may be applied to the method of FIG. 6.

The invention provides a multipath charger and a method for charging a battery. The multipath charger can selectively enable one or more charging paths, so as to optimize the efficiency of the charging process of the battery. Since the battery may be charged through more than one charging paths, the proposed multipath charger can provide a stronger charging capability than a conventional design, and such a design may be used to shorten the total charging time and reduce the thermal effect (because the thermal effect is distributed to more charging paths). Furthermore, the cost of the wires and adapters may be decreased because they are merely operated at a relatively low temperature and cheaper materials may be adopted.

The above values of voltages, currents, and resistances are just exemplary, rather than limitations of the invention. One of ordinary skill may adjust these settings according to different requirements. It is understood that the multipath charger and the charging method thereof are not limited to the configurations and flowcharts of FIGS. 1 to 6. The invention may merely include any one or more features of any one or more embodiments of FIGS. 1 to 6. In other words, not all of the features shown in the figures should be implemented in the charge pump and the operating method of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

The invention claimed is:
1. A multipath charger for charging a battery, comprising:
an adapter, wherein the adapter receives power through a wired connection;
a first charging path;
a second charging path, wherein a supply voltage is coupled through the first charging path and the second charging path to the battery; and
a management module, providing the supply voltage, and detecting an operating state of the battery, wherein the management module is configured to selectively enable one of three charging modes, whereby:
in a first charging mode, the management module enables the first charging path,
in a second charging mode, the management module enables the second charging path, and
in a third charging mode, the management module simultaneously enables both the first charging path and the second charging path,
wherein the enabled charging mode is determined according to the operating state of the battery, so as to charge the battery through the enabled charging path or paths, wherein the first charging path comprises a switching charging circuit and the second charging path comprises a linear charging circuit, and wherein both the first charging path and the second charging path receive power from the adapter.

2. The multipath charger as claimed in claim 1, wherein the second charging path is completely separate from the first charging path.

3. The multipath charger as claimed in claim 1, wherein the first charging path is implemented with a main charging circuit, and the second charging path is implemented with an auxiliary charging circuit.

4. The multipath charger as claimed in claim 1, wherein the switching charging circuit comprises:
   a PMOS transistor (P-type Metal Oxide Semiconductor Field Effect Transistor), wherein the PMOS transistor has a gate controlled by the management module, a source coupled to the supply voltage, and a drain coupled to an inner node;
   an NMOS transistor (N-type Metal Oxide Semiconductor Field Effect Transistor),
   wherein the NMOS transistor has a gate controlled by the management module, a source coupled to a ground voltage, and a drain coupled to the inner node; and
   an inductor, wherein the inner node is coupled through the inductor to the battery.

5. The multipath charger as claimed in claim 1, wherein the linear charging circuit comprises;
   a PMOS transistor (P-type Metal Oxide Semiconductor Field Effect Transistor), wherein the PMOS transistor has a gate controlled by the management module, a source coupled to the supply voltage, and a drain coupled to the battery.

6. The multipath charger as claimed in claim 1, wherein the operating state of the battery comprises at least one of a battery voltage, a battery temperature, and a battery capacity.

7. The multipath charger as claimed in claim 6, wherein when the battery temperature is higher than a temperature threshold, the management module reduces a current through the first charging path and/or the second charging path.

8. The multipath charger as claimed in claim 6, wherein when the battery temperature is higher than a temperature threshold, the management module disables one or both of the first charging path and the second charging path.

* * * * *